Patented Nov. 6, 1923.

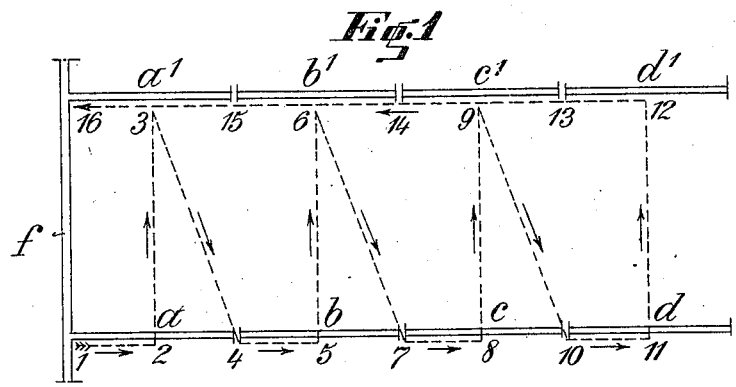
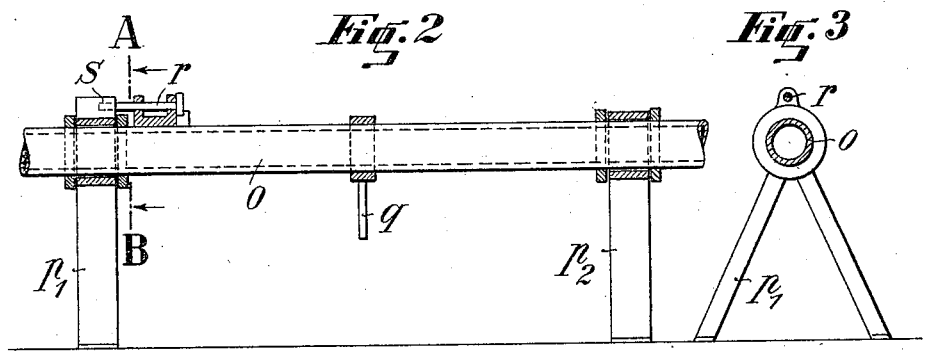
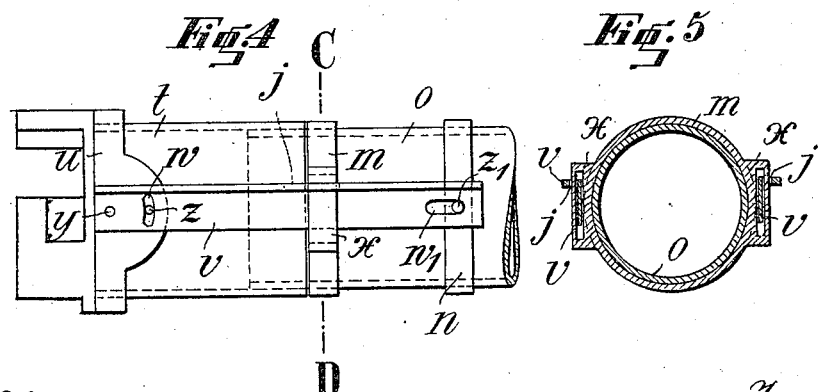

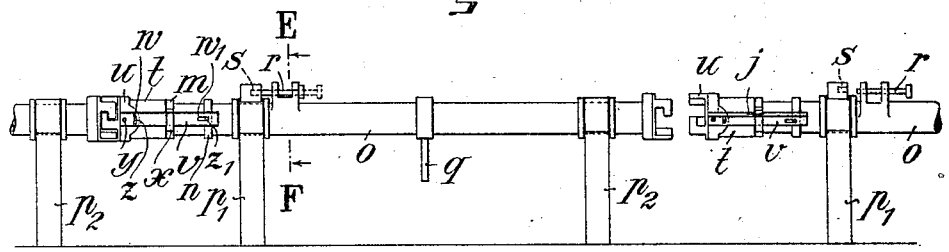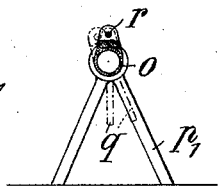

1,472,799

UNITED STATES PATENT OFFICE.

WALTER KRAUSE, OF FRIESACK, GERMANY.

IRRIGATION SYSTEM.

Application filed May 20, 1920. Serial No. 383,021.

*To all whom it may concern:*

Be it known that I, WALTER KRAUSE, a citizen of Germany, and resident of Friesack, Mark, Germany, have invented certain new and useful Improvements in Irrigation Systems (for which applications have been filed in Germany, August 13, 1917, no patent issued as yet; Austria, January 29, 1919, Patent No. 85,055; Hungary, February 1, 1919, no patent issued as yet; France, February 11, 1919, Patent No. 517,859; Spain, February 27, 1919, Patent No. 69,176; Denmark, February 4, 1919, Patent No. 27,076; Belgium, February 24, 1919, Patent No. 279,058; Netherlands, March 30, 1919, no patent issued as yet; Italy, February 25, 1919, Patent No. 97/542; Sweden, January 31, 1919, no patent issued as yet; Luxemburg, October 4, 1919, Patent No. 11,525; Roumania, October 7, 1919, Patent No. 5,058; Canada, May 26, 1920, no patent issued as yet; Great Britain, January 27, 1920, Patent No. 138,343; Poland, July 5, 1920, no patent issued as yet; Argentine Republic, August 3, 1920, no patent issued as yet), of which the following is a specification.

My invention relates to improvements in irrigation systems, and more particularly in systems of that class in which the conduits, such as the supplying or sprinkling conduits, are composed of sectional pipes provided with supporting members or legs and joints which can readily be made and released, so that the pipes can readily be disconnected and carried to and assembled at another point of use, the length of the pipes being such that one man can just carry the same. The object of the improvements is to construct the pipes in such a way that the distance to be walked by the attendant when carrying the pipes and making the joints is reduced. With this object in view my invention consists in constructing the pipes and their joints in such a way that the joint can be released by the attendant standing near the same or a distance therefrom, for example at the middle of the pipe. For this purpose the pipes are rotatable in their supporting members or legs. By thus constructing the pipes and their legs the pipes adapt themselves to the ground where the ground is not level but is sloping in the direction of the conduit. In order that the invention be more clearly understood an example embodying the same has been shown in the accompanying drawing, in which the same letters of reference have been used in all the views to indicate corresponding parts. In said drawing,—

Fig. 1, is a diagrammatical plan view illustrating the irrigation system,

Fig. 2, is a side view partly in section showing a sprinkling pipe used in the system, Fig. 3, is a cross-section taken on the line A—B of Fig. 2, Figs. 4 and 5, are respectively a side view and a cross-section taken on the line C—D of Fig. 4 and showing a preferred construction of the joint of the sprinkling pipes.

Fig. 6 is a side elevation illustrating the manner of coupling the pipe sections; and Fig. 7 is a cross section on the line E—F of Fig. 6.

In the example shown in the drawing, each of the sprinkling pipes $o$ of the irrigation system is rotatably mounted on supporting members or legs $p_1$ and $p_2$, and it is provided at its median part, that is at its center of gravity, with a handle $q$ by means of which it can be rotated in one or the other direction, as is shown in Figs. 6 and 7. In the preferred form the pipe $o$ is connected with the adjacent sprinkling pipe by means of a coupling which can rapidly be made or released by rotary movement and which is constructed for example in the form of a claw coupling. Therefore, it can be disconnected from the said pipe by rotating the same by means of the handle $q$, provided that temporarily the said adjacent pipe is locked in its supporting members against rotation, for example by means of a bolt $r$ engaging in the locking position in a catch $s$ formed in the top part of the leg $p_1$, as is shown in Figs. 2 and 6 at the left.

The locking and unlocking of the sprinkling pipes by means of the bolts $r$ can be effected as the attendant walks along the pipes, so that it is not necessary for him to make a special trip for this particular purpose. Furthermore the sprinkling pipes can be disconnected from one another from the middle of the pipes, and they can also be connected by the attendant standing near the joints. Therefore the attendant has to walk the path indicated in Fig. 1 in dotted lines, which as appears from the said figure is very short. In Fig. 1, the letter $f$ indicates the field conduit, the letters $a$, $b$, $c$, and $d$ indicate the sectional pipes in their original positions, and the letters $a^1$, $b^1$, $c^1$, and $d^1$ indicate the said sectional pipes in their successive shifted positions after carrying the same to the next place of use. If disconnecting is indicated by the letter $x$, making the joint by the letter X, unlocking by the letter $r$, and locking by the letter R, the pipes are advanced as follows: $1x$—$2x$—$3$—$4r$—$5x$—$6$—$7r$—$8x$—$9$—$10r$—$11$—$12$—$13RX$—$14RX$—$15RX$—$16X$.

The supporting members or legs $p_1$, $p_2$ which are rockable relatively to the pipes can adapt themselves to the ground, if the latter is sloping in the direction of the field conduit. However, in addition, the sprinkling pipes must be adapted to follow any differences of the level in a direction longitudinal of the sprinkling pipes. Therefore, in the preferred form shown in Figs. 4 and 5, each of the sprinkling pipes is provided at one end with a short flexible tube or hose which carries at its opposite end one half of a joint, and which is locked against rotary movement and is shiftable within certain limits laterally as well as longitudinally. In Figs. 4 and 5 illustrating the coupling mechanism by way of example, the letter $o$ indicates the end of one of the sprinkling pipes, $t$ the flexible tube connected therewith, and $u$ the section of a claw coupling. The annular coupling member $u$ is flattened at both sides of its central portion, and is connected with two angle irons $v$ by means of bolts $y$ and $z$, the bolt $z$ engaging in a transverse slot $w$, the connection at $y$ being pivotal. The upright flanges of the said angle irons $v$ are guided at their outer and inner faces by lateral ears or pockets $x$ of a ring $m$ which is rigidly connected with the pipe $o$, the upright walls of the pockets $x$ passing through slots $j$ of the horizontal flanges of the angle irons $v$. Each of the angle irons $v$ is in addition slidably connected with its inner end to a ring $n$ secured to the pipe $o$ by means of a bolt $z_1$ engaging in a horizontal slot $w_1$.

I claim:

1. In irrigation systems, a conduit composed of sections, supports in which said sections are mounted rotatably, means for coupling or releasing adjacent sections by a rotary movement about the longitudinal axis of said sections, and bolts mounted to slide lengthwise of said axis for locking the sections in coupled position and respectively engageable with said supports.

2. In irrigation systems, a conduit composed of pipe sections and a flexible tube mounted on one end of each pipe section, means for supporting such tube and confining its motion to two directions one of which is transverse to said pipe section and the other longitudinal of such pipe section, a support in which each of said pipe sections is journaled, a coupling member mounted on the other end of each pipe section, and another coupling member mounted on said tube and adapted to be locked to or released from said first-named coupling member by the rotation of said pipe section in its support.

In testimony whereof I hereunto affix my signature in the presence of two witnesses.

WALTER KRAUSE.

Witnesses:
 GRETE GUTZEIT,
 GERTRUDE FÀHURICH.